(No Model.)

M. J. DELANEY.
FIFTH WHEEL.

No. 507,422. Patented Oct. 24, 1893.

UNITED STATES PATENT OFFICE.

MICHAEL J. DELANEY, OF OSHKOSH, WISCONSIN.

FIFTH-WHEEL.

SPECIFICATION forming part of Letters Patent No. 507,422, dated October 24, 1893.

Application filed January 23, 1893. Serial No. 459,347. (No model.)

*To all whom it may concern:*

Be it known that I, MICHAEL J. DELANEY, a citizen of the United States, residing at the city of Oshkosh, in the county of Winnebago and State of Wisconsin, have invented certain new and useful Improvements in Running-Gear for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in running gear for vehicles and particularly to the manner of attaching the reach to the front axle, my invention providing for the passage of the reach between the axle and the bed of the vehicle and being secured by the king bolt which passes through the reach and through plates attached respectively to the axle and bed above and below.

Figure 1:
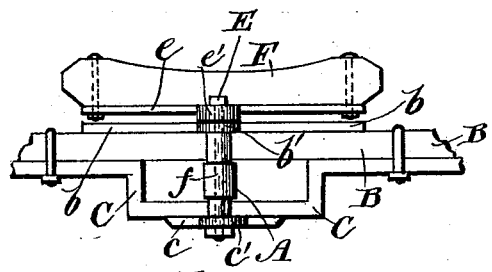
Figure 2:
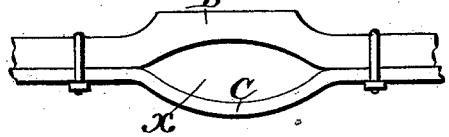
Figure 3:
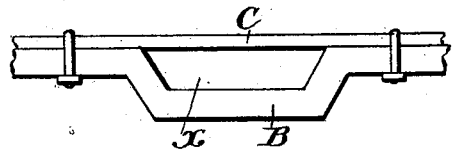
Figure 4:
Figure 6:
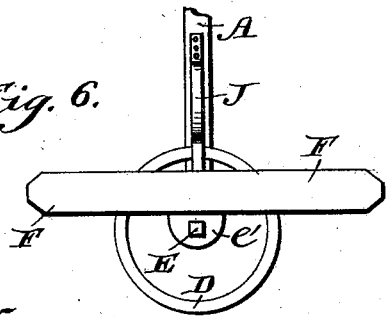
Figure 5:
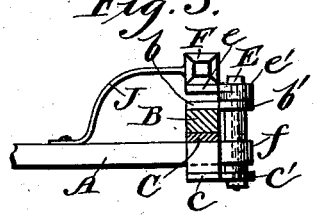

In the accompanying drawings, Figure 1 illustrates one form of my invention with the axle straight and the bed below the axle bent to allow of the passage of the reach between the axle and bed. Fig. 2 represents another form with both the axle and bed shaped to admit the reach between them; Fig. 3 another form thereof with the bed straight, and the axle arranged beneath the bed and bent to admit the reach below the bed. Fig. 4 represents still another form of the invention with the bend above the axle, each of the views being a front elevation. Fig. 5 is a side view of the form of construction shown in Fig. 1 illustrating the invention as adapted for use with a front king bolt; Fig. 6 a plan view with the addition of a fifth wheel; and Fig. 7 shows my invention as adapted for use with a rear king bolt.

A in the drawings is the reach, B the axle, and C the bed of a vehicle; $b$ a plate attached to the axle and $c$ a plate attached to the bed. These plates are preferably slipped to their respective parts. The gearing may be used with or without the circle or fifth wheel D. The connecting plates as $b$, $c$ and $e$ may be attached to the bed $c'$, axle B and head block F by means of bolts or other suitable fastening means. Integral with the plates $b$, $c$ and $e$ are projections $b'$, $c'$ and $e'$ provided with openings through which the king bolt E passes, said bolt also passing through an opening $f$ at or near the end of the reach A. A brace J is attached to the head block F and reach A.

Figure 7:
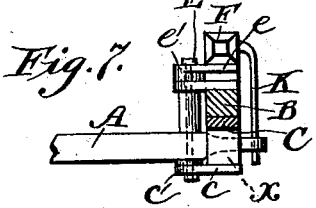

In the adaptation of my invention to a rear king bolt as shown in Fig. 7, the reach extends forward through the opening $x$ between the bed and axle and is attached to the head block F by means of the brace K. The head block and reach are held rigid by the brace J, and the axle B and bed C turn upon the king bolt.

I do not claim under this application the construction shown in Fig. 5, as the same may constitute the subject-matter of another application.

What I claim as my invention is—

In a vehicle gear, the combination of a reach passing through an opening between the bed and axle and connected by means of a king bolt to plates attached respectively to the head block, axle and bed, said king bolt passing through protecting and strengthening projections $b'$, $c'$, $e'$ and $f$, and a brace K secured at its upper end to the head block and having its lower end passed through an opening formed in the end of the reach, substantially as and for the purpose described.

In testimony whereof I affix my signature in presence of two witnesses.

MICHAEL J. DELANEY.

Witnesses:
CLARENCE TURCK,
A. E. JONES.